Sept. 9, 1947.                W. GUIER                2,427,135
                              DRIVE UNIT
                       Filed Dec. 17, 1943        4 Sheets-Sheet 1
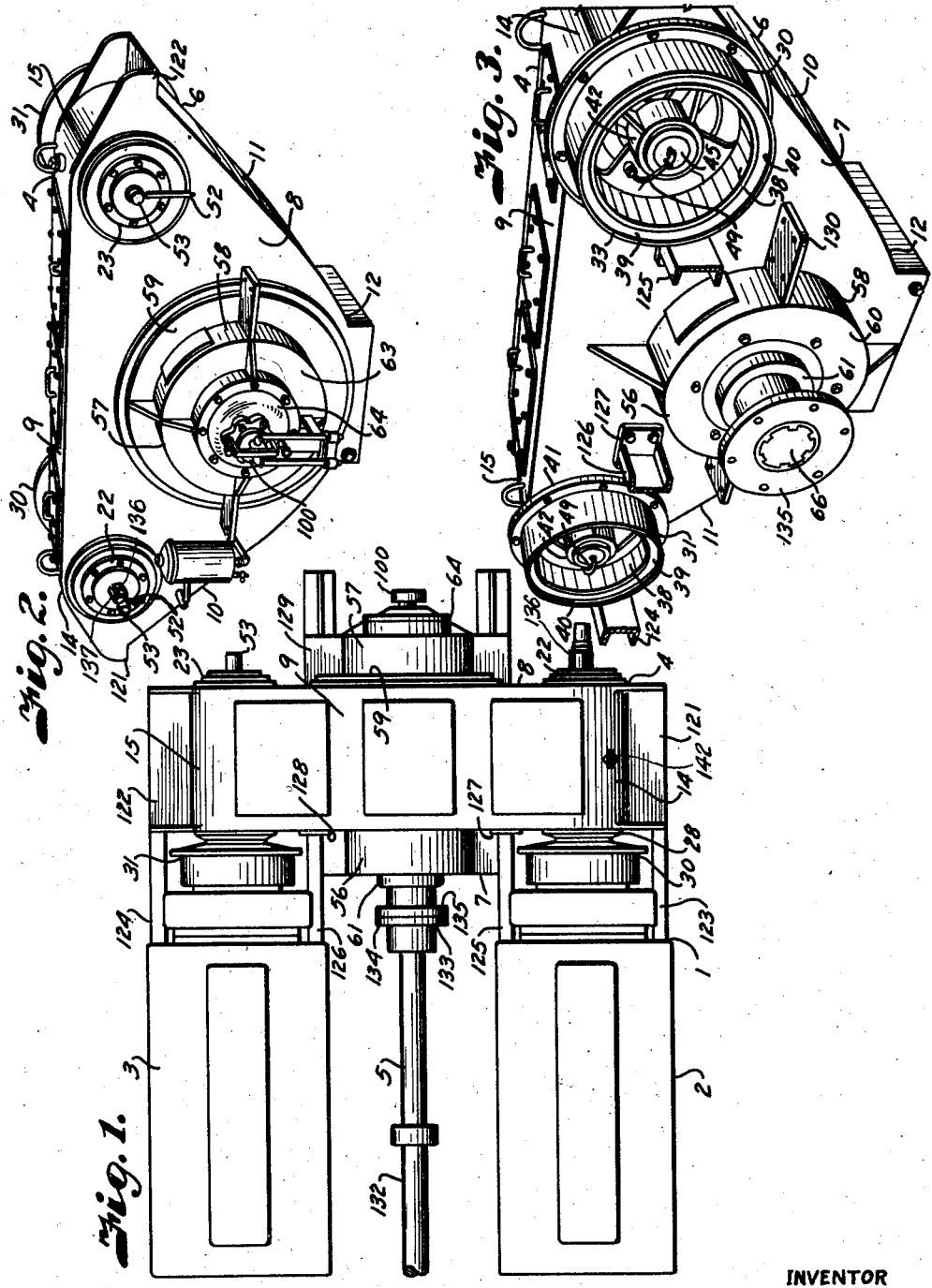
INVENTOR
William Guier.
BY
ATTORNEY

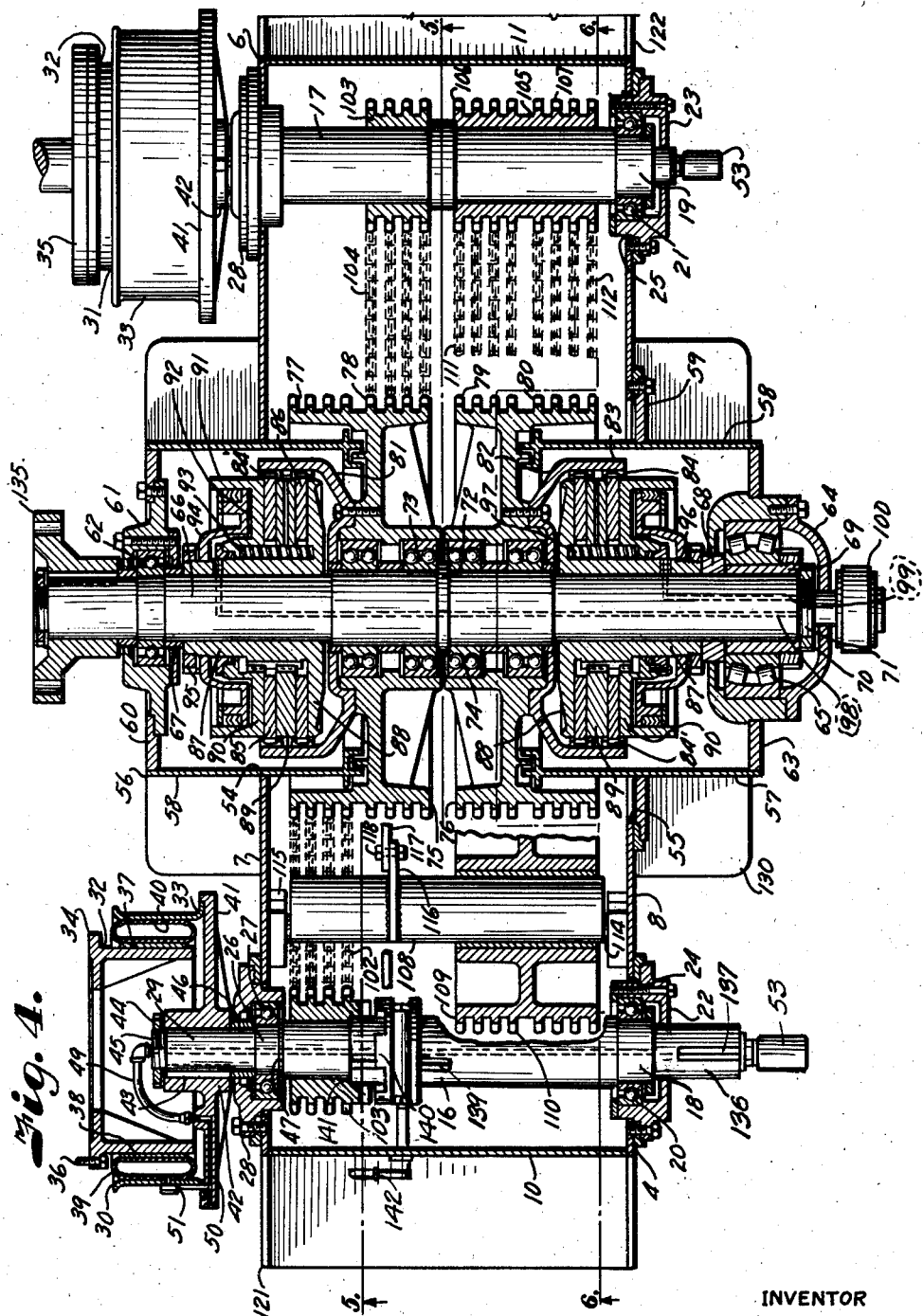

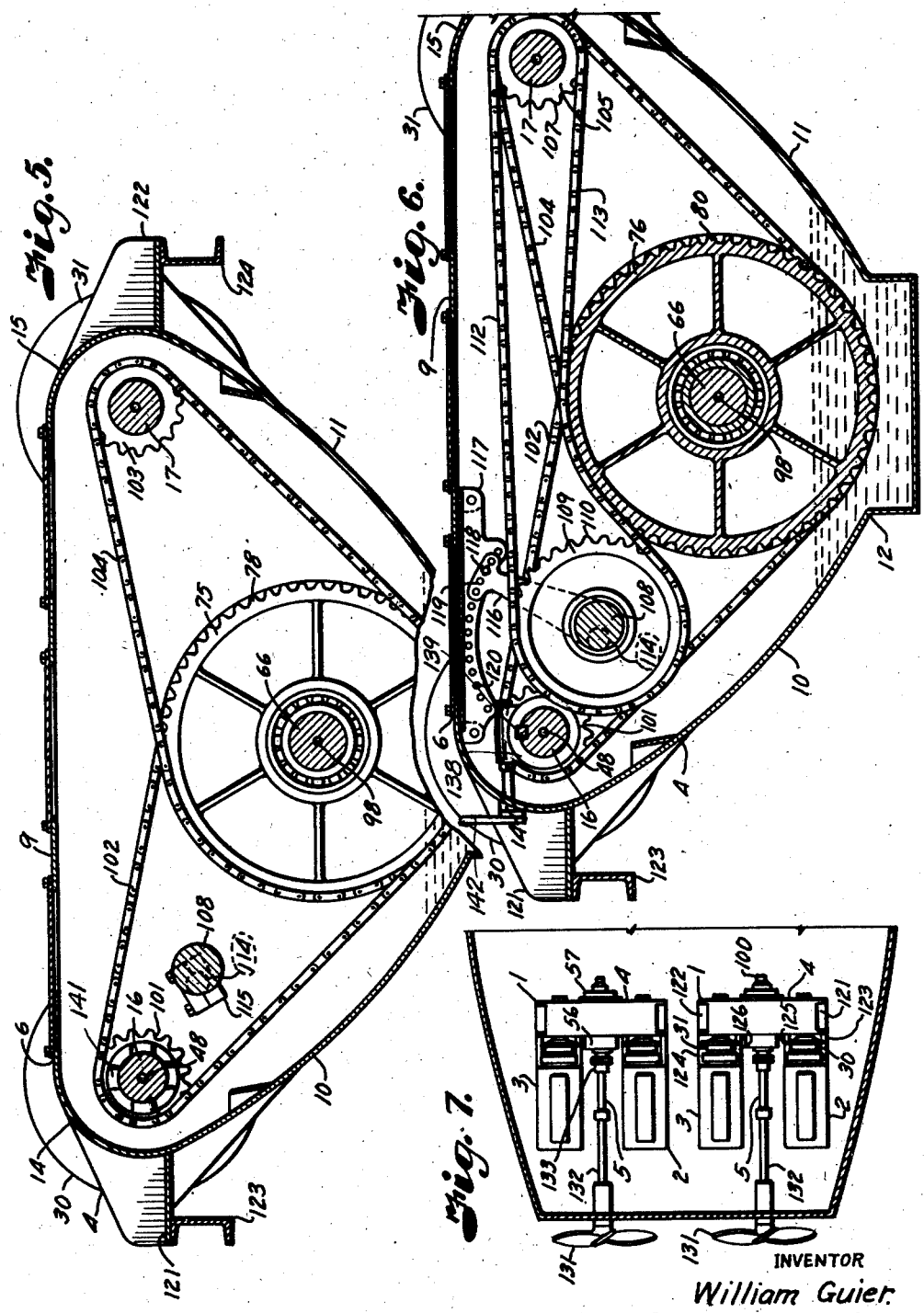

Sept. 9, 1947.　　　　W. GUIER　　　　2,427,135
DRIVE UNIT
Filed Dec. 17, 1943　　　4 Sheets-Sheet 4
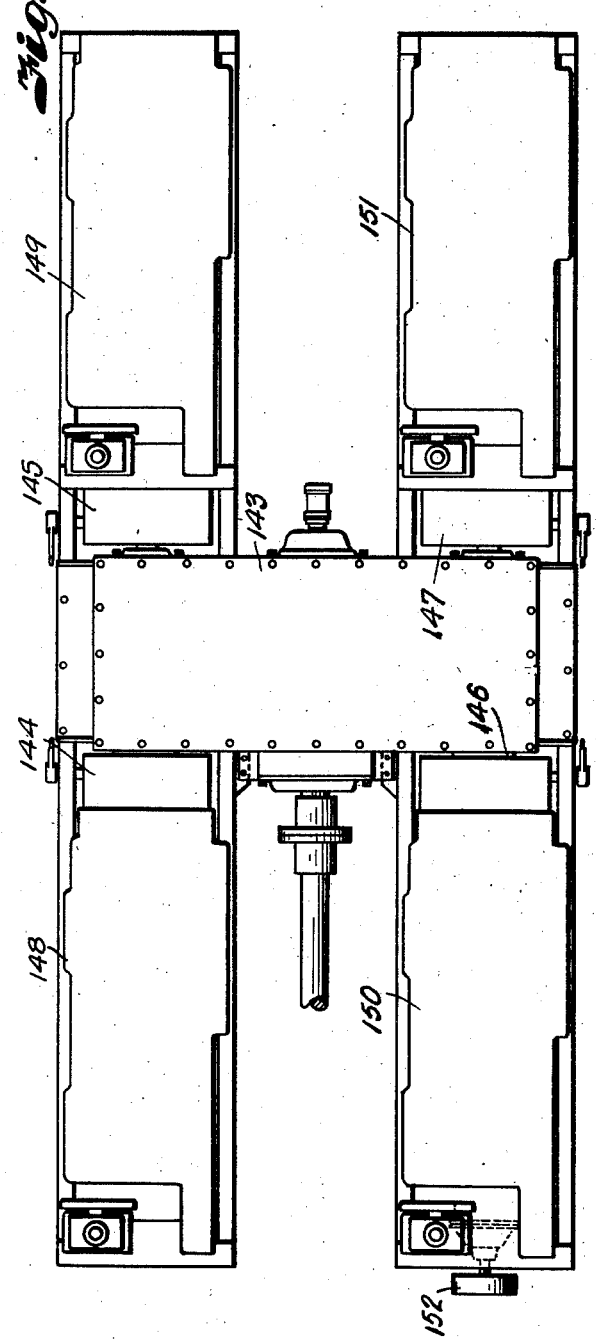
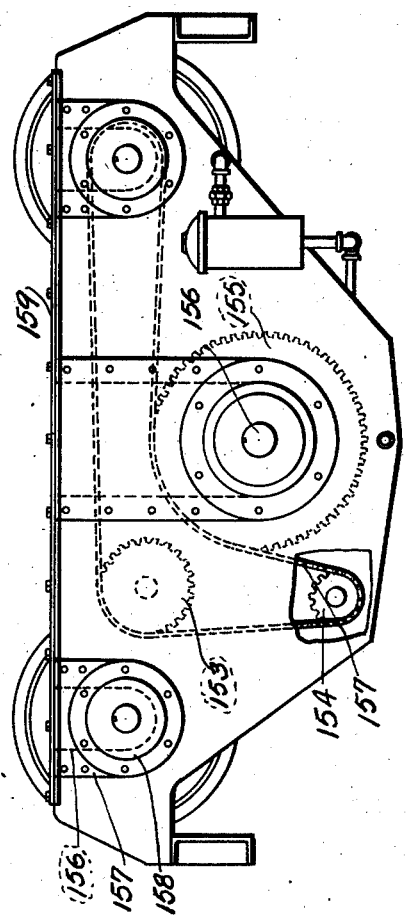
INVENTOR:
William Guier.
BY
ATTORNEYS.

Patented Sept. 9, 1947

2,427,135

UNITED STATES PATENT OFFICE 2,427,135

DRIVE UNIT

William Guier, Tulsa, Okla., assignor to Unit Rig & Equipment Company, Tulsa, Okla., a partnership Application December 17, 1943, Serial No. 514,593

10 Claims. (Cl. 74—218)

This invention relates to a power transmitting apparatus which includes a plurality of relatively small high-speed engines connected together for furnishing a given horsepower, and has for its principal objects to provide a power unit of this character wherein the engines are compounded through a speed reducing transmission for actuating a common driven member in forward or reverse directions; to provide a simple compact power unit that is of light weight and low in initial cost; to provide a power unit wherein anyone of the engines may be utilized to maintain continuity of service in either direction of drive; to provide means for selectively disconnecting one of the engines from the power transmitting apparatus so that the disconnected engine may be used for purposes independently of the other engines; to provide a unit construction capable of parts standardization; to provide a power unit wherein all the parts are readily accessible for inspection and repair and to provide a power unit having single controls adapted for remote operation.

The present invention is adapted to many fields of installation which require compounding of power units, however, by accomplishing the above and other objects hereinafter pointed out, the resulting power is especially adapted for marine duty. This is particularly true because a plurality of small compounded engines present many advantages over the single heavy duty slow speed reversing type Diesel engine, heretofore used in powering of ships. The single type reversing engines were necessarily of massive size and heavy construction; consequently, they are of high initial cost and require considerable engine room space which can be otherwise used for cargo purposes. Also, a plurality of small compounded engines is especially adapted to furnish the power necessary to propel a vessel under any condition and one of the engines may be disconnected to operate winches and other equipment while the vessel is under power.

I have, therefore, illustrated in the accompanying drawings, an adaption of my invention to the powering of ships wherein:

Fig. 1 is a plan view of a power unit embodying the features of the present invention.

Fig. 2 is a perspective view of the transmission element of the unit as viewed from one side thereof.

Fig. 3 is a similar perspective view of the transmission as viewed from the opposite side.

Fig. 4 is an enlarged horizontal section through the transmission element of the unit.

Fig. 5 is a cross section on the line 5—5 of Fig. 4.

Fig. 6 is a cross section on the line 6—6 of Fig. 4.

Fig. 7 is a diagrammatic view of the stern of a ship equipped with a power unit.

Fig. 8 is a modified grouping of power units which permits use of one unit for a purpose independent of that of the other units.

Fig. 9 is an end elevation of a modified form of transmission element.

Referring more in detail to the drawings:

1 designates a power unit constructed in accordance with the present invention and which includes a pair of relatively small engines such as are at present manufactured in quantity production, for example, a pair of light-weight, high-speed Diesel engines 2 and 3, and which are connected in compound drive by a transmission 4 so that the combined power of both engines may be transmitted through a shaft 5 to a driven mechanism.

In the illustrated instance, the engines are spaced apart and connected by the transmission so that the shaft 5 extends between the engines and connects with the mechanism to be actuated. When thus arranged, the unit is extremely compact and requires a relatively small space in an engine room. The transmission 4 includes a housing 6 having parallel walls 7 and 8, connected by a substantially flat top 9 and side walls 10 and 11 that extend downwardly and inwardly to connect at their lower ends by a trough-shaped bottom 12 which forms a lubricant containing sump 13. The walls 10 and 11 merge in rounded curves with the top 9 as indicated at 14 and 15 to accommodate driving shafts 16 and 17.

The shafts 16 and 17 are located coaxially with respect to the power shafts of the engines 2 and 3 and extend transversely of the housing 6. The shafts have reduced ends 18 and 19 preferably journalled in anti-friction bearings 20 and 21 that are carried within bearing housing 22 and 23 mounted in the openings 24 and 25 formed in the wall 8. The opposite ends of the shafts 16 and 17 have similarly reduced bearing portions 26 journalled in anti-friction bearings 27 that are carried in housings 28 mounted in openings provided in the wall 7. Projecting from the bearing portions 26 of the driving shafts are reduced extensions 29 respectively mounting clutches 30 and 31 for connecting and disconnecting the engines with respect to the driving shafts 16 and 17.

The clutches 30 and 31 may be of any suitable construction but are illustrated in the drawings as including inner and outer drums 32 and 33. Each inner drum 32 includes a flange 34 adapted to be connected with a mating flange 35 on the terminal end of a respective engine shaft by fastening devices such as cap-screws 36, Fig. 4. The inner drums have peripherial faces 37 adapted to be engaged by shoes 38 carried within inflatable rings 39 that are attached to the inner circumferential faces 40 of the outer drums as shown in Fig. 4. The outer drums also include disk portions 41 that are carried on hubs 42 secured to the reduced ends of the shafts by splines 43. Cooperating with the splines are jam nuts 44 threaded on reduced terminals 45 of the shaft extensions to retain the hubs in abutting contact with spacers 46 that retain the inner races of the anti-friction bearings 26 in engagement with shoulders 47 formed by reduction in shaft diameter. The driving shafts are provided with longitudinal bores 48 for conducting compressed air to the inflatable rings 39. The ends of the axial bores adjacent the clutches are connected by tubular ducts 49 with channels 50 formed within the disk portions of the outer drums as shown in Fig. 4. The terminal ends of the channels being connected with the inflatable rings 39 through connections 51. Pipes 52 leading from a source of compressed air supply are connected with the opposite ends of the bores 48 through glands 53. It is thus obvious that when compressed air is supplied through the bores 48 and 49, channels 50 and connections 51, the rings 39 are expanded between the drums to press the shoes 38 into driven contact with the clutch faces 37 of the inner drum so that when the engines are operated the driving shafts are rotated in the direction of engine crank shaft rotation.

Mounted in openings 54 and 55 that are provided in opposite side walls 7 and 8 at points intermediate the journals for the driving shafts 16 and 17 are clutch housings 56 and 57 each comprising a cylinder 58.

The cylinder forming housing 56 is welded directly in the opening 54 but the cylinder forming the housing 57 carries an annular flange 59 that is removably attached to the edge surrounding the opening 55 to permit access to the interior of the transmission housing. The cylinder for the housing 56 is closed at the outer end by a plate 60 having a central housing 61 for an anti-friction bearing 62. The outer end of the cylinder forming the housing 57 is closed by a similar ring 63 carrying a bearing housing 64 for a self-aligning bearing 65.

Rotatably mounted in the bearings 62 and 65 is a shaft 66 having spacing sleeves 67 and 68 engaging the respective sides of the inner race of the bearing 65 whereby the shaft is retained from longitudinal play within the transmission housing. The self-aligning bearing is carried on a sleeve 69 that is secured on the shaft by a lock-nut 70 threaded on a reduced end 71 of the shaft. Formed on the shaft intermediate the side walls 7 and 8 is a collar 72 which spaces pairs of anti-friction bearings 73 and 74 that rotatably mount sprockets 75 and 76 having spaced sets of sprocket teeth 77—78 and 79—80 respectively. The sprocket teeth of each set are arranged in spaced series so as to provide a sufficient number of driving chains to transmit safely the power of the engines.

Secured to the hubs of the sprockets are clutches 81 and 82 including drums 83 provided with internal teeth 84 for engaging the external teeth 84' on clutch plates 85 and 86. Cooperating with the clutch drum of each clutch is a hub member 87 having a backing plate 88 adapted to be frictionally engaged by the inner clutch plates 86. Slidably keyed to the hub of each clutch are plates 89 and 90, the plate 89 engaging between the plates 85 and 86 and the plate 90 engaging against the outer face of the plate 85 of the clutches. The plates 90 carry cylinders 91 coaxially of the shaft and cooperate with the hubs to form annular piston chambers 92 in which are mounted annular pistons 93 having the hub portions 94 thereof supported in fixed relation on the hubs 87 by means of jam nuts 95 that are threaded on the hubs to retain the hubs of the piston in engagement with shoulders 96 formed on the hubs. The clutch plates are normally retained in freely spaced relation by coil springs 97. In order to effect driving engagement of the clutch plates, compressed air is admitted to the piston chambers through bores 98 and 99 respectively that are provided in the driving shaft and which terminate in lateral ports opening into the piston chambers. When air is admitted to the bores through a gland 100 on the outer end of the shaft 66, the plates carrying the cylinders 91 are caused to move in driving contact with the clutch plates 85 and shift the clutch plates 85 into a driving engagement with the clutch plates 90 and the clutch plates 90 into driving connection with plate 88 so that the clutch plates 85, 89, and 86 are clamped between the backing and cylinder plates 88 and 90. When thus engaged the clutches connect their respective sprockets with the driven shaft.

Mounted on the driving shaft 16 in aligning registry with the sprocket teeth 77 is a sprocket 101 having a plurality of teeth corresponding to the spaced teeth of the sprocket set 77 of the sprocket 75 and operating thereover is a plurality of chains 102 whereby the driven shaft 66 is caused to be rotated by the sprocket 75. Likewise fixed on the shaft 17 is a sprocket 103 having teeth registering with the teeth of the set 78 on the sprocket 75 and operating over the teeth are chains 104.

It is obvious that when the driving shafts 16 and 17 are actuated, both shafts are effective in applying power to the sprocket 75 and if the sprocket is connected with the driven shaft through the clutch 81, both engines are effective in transmitting power to the driving shaft. However, if one of the driving shaft clutches 30 or 31 is disengaged the power transmitted to the driven shaft is that of the engine which is then in connection with the other driving shaft.

Since engines of the type referred to are not equipped with reversing mechanism, means are provided to actuate the driven shaft in reverse direction under the combined power of both engines or by the power of one engine independently of the other engine. This is effected by one or the other of the engines by way of the sprocket 76. Fixed on the driving shaft 17 is a sprocket 105 having sets of sprocket teeth 106 and 107 registering with the teeth 79 and 80 on the sprocket 76. Mounted in the housing intermediate the shafts 16 and 66 is an idler shaft 108 carrying an idler sprocket 109. The idler sprocket also has sets of teeth 110 registering with the sets of teeth 79 and 80 on the sprocket 76 and sprocket 105. Operating over the sprockets 105 and 109 are sets of endless chains 111 and 112 having the lower runs 113 thereof engaging the teeth on the sprocket 76 at a point above the horizontal diameter thereof whereby reverse rotation of the shaft 66 is effected through one or both engines.

In order to adjust tension of the reversing chains 111 and 112, the ends of the idler shaft 108 has eccentrically positioned trunnions 114 that are mounted in bearings 115 on the side walls 7 and 8 of the housing. The idler shaft is rocked on its trunnions by a lever arm 116 adjustably anchored to a bracket 117 that depends from the top of the housing, the arm being secured to the bracket by a pin 118 which is projected through one of a series of openings 119 in the arm which registers with one of a series of openings 120 of the bracket when the chains have the proper tension. In order to provide a support for the unit, the walls 10 and 11 of the transmission housing 6 have laterally extending arms 121 and 122 mounted on longitudinal channels 123 and 124 which carry the outer sides of the respective engines. Cooperating with the channels 123 and 124, to support the inner sides of the engines, are similar channels 125 and 126 having their ends welded to plates 127 and 128 attached to the wall 7 of the transmission housing. The transmission housing may be supported on a suitable frame work 129 attached to arms 130 projecting laterally from the clutch housing 56 and 57 as best shown in Figs. 1 to 3 inclusive.

Assuming that a power unit assembly constructed in accordance with the present invention is to be installed within the stern of a vessel, the assembly may be arranged with the engines located in the direction of the stern so that the driving shaft 5 extends between the engines to connect with the propeller through a shaft extension 132, the shaft 5 being connected with the driven shaft 66 of the transmission by a coupling 133 having flanges 134 and 135 connected by suitable fastening devices.

If the vessel is to be operated by double screws, as shown in Fig. 7, two power units may be employed to actuate the respective screws.

In operating the vessel under full power, both clutches 30 and 31 are rendered effective to connect the engines with their respective driving shafts 16 and 17. Power of both engines is then transmitted to the sprocket 75 by means of chains 102 and 104. Upon engaging the clutch 81 and disengaging the clutch 82, the sprocket 75 is connected in driving relation with the shaft 66 so that the power of both engines is applied to the propeller connected therewith to operate the vessel in a forward direction.

When it is desired to reverse movement of the vessel the propeller rotation is reversed under the power of both engines by effecting disconnection of the clutch 81 and effecting connection of the clutch 82 so that the sprocket 76 is in driving connection with the shafts 66. Rotation of the shafts 16 and 17 in a counterclockwise direction imparts a reverse rotation to the sprockets 76 to reverse the propeller and effect movement of the vessel in the opposite direction.

It is obvious that the propeller is rotated at a slower speed than the speed of the engines due to the differential size of the sprockets on the driving shaft relative to the sprockets on the driven shaft. Should one of the engines fail to operate, the vessel may be actuated by the other engine, upon disconnection of the clutch for the engine out of operation. For example, if the engine 2 should fail to operate or require repairs, the clutch 30 is disengaged so that the shaft 16 may rotate freely in its bearings. Power of the engine 3 is then applied through the shaft 17, sprocket 103, chain 104, sprocket 75, and clutch 81 to the driven shaft 66 of the transmission. Should it become necessary to reverse the propeller when the engine 2 is out of service, the clutch 81 is disconnected from driving relation with the shaft 66 and the sprocket 76 is connected in driving relation with the shaft 66. The sprocket 105 then drives the sprocket 76 through the chains 111 and 112 so that power is applied to the shaft 66 in a reversed direction. Should the engine designated 3 be the one out of service, the clutch 31 is disconnected and the clutch 30 is connected. Power of the engine 2 is then directly applied to the shaft 16. One or the other of the sprockets 75 or 76, depending upon the desired direction of propulsion, is engaged to actuate the shaft 66. If the sprocket 75 is connected with the shaft 66 and the sprocket 76 is disconnected therewith, then the drive is through the chains 102 and 104 in a forward direction from both engines. If the clutch 82 is the one engaged and the clutch 81 disengaged, the drive for one engine is through sprocket 101, chain 102, sprocket 75, chain 104, sprocket 103, shaft 17, sprocket 105 and the sets of chains 111 and 112 to reverse rotation of the shaft 66. The drive of the other engine is directly to the shaft 17 and then through the sprocket 105 and reversing chains 111 and 112.

It is thus obvious that the power unit provides for continuity of service because if one of the engines fails the other engine is effective and can be depended upon to propel the vessel with little loss of speed.

The down engine can be repaired without interruption and can be put into service without stopping the propeller merely by admitting the compressed air into clutches 30 and 31 as the case may be. On larger vessels where twin screw power units are used, (Fig. 7), substantially greater power is provided and continuity of service is correspondingly assured by reason of the greater number of the engines. The single unit, however, is desirable in small vessels particularly fishing boats, as a single screw propeller is less likely to be fouled by fishing nets.

In some marine instances it may be desirable to utilize one of the engines for operating auxiliary machinery while the other engine is used to power the vessel; for example, in a dragger type fishing vessel one of the engines may be used for propelling the boat while the other is used to bring in the nets. In this instance, the shaft 16 is provided with an extension 136 having a keyway 137 for mounting a sprocket or pulley, not shown, that will be utilized for driving the net winch mechanism. In order to disconnect the shaft from drive relation with the sprocket 103, the sprocket is fixed to the shaft through a clutch collar 138 that is slidably secured by a spline 139. The clutch collar has jaws 140 meshing with jaws 141 on the sprocket 103. The clutch collar is moved to and from driving connection with the sprocket by a suitable shift mechanism including a lever 142.

In Fig. 8 is illustrated a modified arrangement of compound engine drive. In this instance the ends of the driving shafts of the transmission 143 are connected through manually actuated clutches 144, 145, 146, and 147 with engines 148, 149, 150, and 151 respectively. In this instance the engines 149 and 151 must have crank shafts having anti-clockwise rotation, or they may be of a type equipped with a front power take-off that permits taking full horsepower from the front ends of the crankshafts. One or more of the engines may be provided on the ends opposite the transmission with a power take-off 152, thus, for example, when the clutch 146 is disconnected the power take-off 152 permits the use of the engine 150 independently of the other three engines. With the clutch 146 disengaged, the engine 150 may be throttled to any desired speed while the remaining engines are operated to maintain the desired speed of the vessel.

In Fig. 9 is illustrated a modified form of transmission wherein the reverse drive involves the use of a pair of idler gears 153 and 154 spaced apart and arranged radially with respect to the driven sprocket 155 on the driven shaft 156. This arrangement of idlers provides for more extended contact of the lower run 157 of the reverse chain with the sprocket 155. In this form of transmission the end walls of the transmission housing are provided with downwardly extending slots or notches 156 which are closed by plates 157 carrying the bearing housing 158 that mount the ends of the driving shafts.

The entire top of the housing has an opening closed by a cover plate 159. In making repairs the cover plate 159 may be removed after which the fastening devices which secure the plates 157 are removed and the entire driving shaft assemblies may be lifted from the transmission through the notch-like openings 156.

It is obvious that power unit constructed as above described is of light weight per horsepower, is low in initial cost per horsepower, occupies a relatively small amount of engine room space, provides continuity of service, is easy to repair, and provides for standardization of parts in the manufacture thereof.

What I claim and desire to secure by Letters Patent is:

1. In combination with a plurality of engines and a member actuated thereby including, a rotatable member for each engine, clutches connecting the rotatable members with their respective engine for actuation thereby, a driven member, a driving connection between each rotatable member and the driven member to drive the driven member in the direction of engine operation, a reverse driving connection between one of said rotatable members and the driven member, clutches in said driving connections, and means for effecting selective engagement of one of the last named clutches and release of the other.

2. In combination with a plurality of engines and a member actuated thereby including a rotatable member for each engine, clutches connecting the rotatable members with their respective engines for actuation thereby, a driven member, a driving connection between each rotatable member and the driven member to drive the driven member in the direction of engine operation, a reverse driving connection between one of said rotatable members and the driven member, clutches in said driving connections, means for effecting selective engagement of one of the last named clutches and release of the other, and means for independently actuating the first named clutches.

3. An engine compounding transmission unit including a pair of driving shafts, a driven shaft, sprockets on the driving shafts, sprocket means on the driven shaft separate chains operating over the driving shaft sprockets and the sprocket means on the driven shaft, a second sprocket means on the driven shaft, an idler sprocket aligned with the second sprocket means, a sprocket on one of the driving shafts aligned with the idler sprocket, a chain operating over the last named sprocket and the idler sprocket and having a run of said chain in driving contact with the second sprocket means to reverse rotation of the second sprocket means relatively to the first sprocket means, and clutch means for selective connection of each sprocket means with the driven shaft.

4. An engine compounding transmission unit including a pair of driving shafts, a driven shaft, sprockets on the driving shafts, sprocket means on the driven shaft separate chains operating over the driving shaft sprockets and the sprocket means on the driven shaft, a second sprocket means on the driven shaft, an idler sprocket aligned with the second sprocket means, a sprocket on one of the driving shafts aligned with the idler sprocket, a chain operating over the last named sprocket and the idler sprocket and having a run of said chain in driving contact with the second sprocket means to reverse rotation of the second sprocket means relatively to the first sprocket means, clutches for selective connection of the sprocket means with the driven shaft, engine connections on the driving shafts, and separate clutches in said engine connections.

5. A compounding transmission unit including a pair of driving shafts, a driven shaft, sprockets on the driving shafts, relatively larger sprocket means on the driven shaft separate chains operating over each driven shaft sprocket and the sprocket means on the driven shaft, a second sprocket means on the driven shaft substantially corresponding in diameter to the first named sprocket means, an idler sprocket aligned with the second sprocket means, a sprocket on one of the driving shafts having substantially the diameter of the first named sprockets and aligned with the idler sprocket, a chain operating over the last named sprocket and the idler sprocket and having a run thereof in driving contact with the second sprocket means to reverse rotation of the second sprocket means relatively to the first sprocket means, clutches for selective connection of the respective sprocket means with the driven shaft and clutches for controlling rotation of the driving shafts.

6. A compounding transmission unit including a pair of driving shafts, a driven shaft, sprockets on the driving shafts, a clutch for selectively connecting one of the sprockets with its shaft, sprocket means on the driven shaft separate chains operating over each driven shaft sprocket and the sprocket means on the driven shaft, a second sprocket means on the driven shaft substantially corresponding in diameter to the first named sprocket means, an idler sprocket aligned with the second sprocket means, a sprocket on one of the driving shafts having substantially the diameter of the first named sprockets and aligned with the idler sprocket, a chain operating over the last named sprocket and the idler sprocket and having a run thereof in driving contact with the second sprocket means to reverse rotation of the second sprocket means relatively to the first sprocket means, clutches for selective connection of the respective sprocket means with the driven shaft and clutches for controlling rotation of the driving shafts.

7. In an engine powered ship, a propeller shaft, an engine on opposite sides of the axis of the propeller shaft, a rotatable member for each engine, clutches connecting the rotatable members with their respective engine for actuation thereby, a driven member connected with the propeller shaft, a driving connection between each rotatable member and the driven member to drive the driven member in the direction of engine operation, a reverse driving connection between one of the rotatable members and the driven member, clutches in the driving connections with the driven member, and means for effecting engagement of one of the clutches and disengagement of the other clutch to drive the propeller shaft in forward and reverse directions.

8. A power unit including a transmission housing, spaced pairs of engine supporting sills connected with the housing and extending laterally therefrom, an engine carried by each pair of sills, a rotatable member in the housing for each engine, clutches connecting the rotatable members with their respective engine for actuation thereby, a driven member in the housing, a driving connection in the housing between each rotatable member and the driven member to drive the driven member in the direction of engine operation, a reverse driving connection in the housing between one of said rotatable members and the driven member, clutches in the driving connections, means for effecting selective engagement of one of the last-named clutches and release of the other, and a shaft extension connected with the driven member and located between said engines.

9. In an engine powered ship, a power unit including a plurality of engines, a propeller driving shaft, a rotatable member for each engine, clutches connecting the rotatable members with their respective engine for actuation thereby, a driving connection between each rotatable member and the propeller driving shaft to drive said shaft in one direction, a reverse driving connection between one of said rotatable members and the propeller driving shaft, clutches in the driving connections, means for effecting selective engagement of one of the last-named clutches and release of the other, and a separate power take-off for one of said engines.

10. In combination with a plurality of engines and a member actuated thereby including, a rotatable member for each engine, clutches connecting the rotatable members with their respective engine for actuation thereby, a driven member, a driving connection between each rotatable member and the driven member to drive the driven member in the direction of engine operation, a reverse driving connection between one of said rotatable members and the driven member, clutches in said driving connections, means for effecting selective engagement of one of the last-named clutches and release of the other, and a power take-off connection with one of said engines.

WILLIAM GUIER.

REFERENCES CITED

The following references are of record in the file of this patent:

UNITED STATES PATENTS

| Number | Name | Date |
|---|---|---|
| 2,155,434 | Marsh | Apr. 25, 1939 |
| 2,311,597 | Schmitter | Feb. 16, 1943 |
| 2,297,400 | Friedrich | Sept. 29, 1942 |
| 1,990,810 | Young | Feb. 12, 1935 |
| 1,139,596 | Stephens | May 18, 1915 |
| 1,971,551 | Curtiss | Aug. 28, 1934 |